United States Patent
Backa et al.

(10) Patent No.: US 6,597,959 B1
(45) Date of Patent: Jul. 22, 2003

(54) METHOD AND DEVICE FOR CONTROLLING AN ESSENTIALLY CONTINUOUS PROCESS

(75) Inventors: Stefan Backa, Västerås (SE); Erik Dahlquist, Västerås (SE); Thomas Liljenberg, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/529,388

(22) PCT Filed: Oct. 15, 1998

(86) PCT No.: PCT/SE98/01854

§ 371 (c)(1),
(2), (4) Date: Apr. 25, 2000

(87) PCT Pub. No.: WO99/19780

PCT Pub. Date: Apr. 22, 1999

(30) Foreign Application Priority Data

Oct. 15, 1997 (SE) .............................................. 9703758

(51) Int. Cl.$^7$ .............................................. G05B 13/04
(52) U.S. Cl. .............................. 700/30; 700/31; 700/34; 700/44; 700/48; 700/73; 700/127
(58) Field of Search ............................... 700/29–31, 34, 700/39, 44, 46, 48, 73, 74, 115, 127; 702/182–185, 81–84

(56) References Cited

U.S. PATENT DOCUMENTS

| | | | |
|---|---|---|---|
| 5,301,101 A | 4/1994 | MacArthur et al. | 364/156 |
| 5,365,423 A | 11/1994 | Chand | 364/140 |
| 5,402,333 A | 3/1995 | Cardner | 364/151 |
| 5,424,942 A | 6/1995 | Dong et al. | 364/164 |
| 5,519,605 A | 5/1996 | Cawlfield | 364/151 |
| 5,654,799 A | 8/1997 | Chase et al. | 356/371 |
| 5,796,609 A * | 8/1998 | Tao et al. | 364/164 |
| 6,026,334 A * | 2/2000 | Kayihan et al. | 700/28 |

FOREIGN PATENT DOCUMENTS

WO     9642008     12/1996

OTHER PUBLICATIONS

Keyes et al., "Control of Paper Basis Weight . . . Distributed Controls" in IFAC 11th Triennial World Congress, USSR 1990.

Schwartz et al., "A Method of Modeling . . . Pulp Properties" in IEEE, Sep. 1996.

* cited by examiner

Primary Examiner—Paul P. Gordon
(74) Attorney, Agent, or Firm—Dykema Gossett PLLC

(57) ABSTRACT

A method and a device for controlling a process (10), having at least two sub-processes (20, 30), by tracking, processing and correcting variables for the product, the production means and/or any process media throughout the process line. The process flow for the first sub-process (20) is divided into slices, each slice representing a specific volume of process flow. At least some of the measured and sampled variable values are related to its specific slice volume. Any variable value obtained is processed using a control and processing, unit (60) with means for receiving, information on variable values on-line, means for presenting (70) the process flow through the production units, means for dividing the process flow into slices, means for processing a variable value obtained, including means for relating, the variable value to is specific slice volume, means to develop one or more multivariate models based on variable values for a multiple of slice volumes and means to combine the multivariate model with a processed variable value for a specific slice volume to predict a variable value and/or a quality variable for subsequent second sub-process (30). Corrective actions are executed in the subsequent second sub-process (30) based on a processed variable value from the first sub-process (20) using, actuating, means (80) for execution of corrective action.

29 Claims, 1 Drawing Sheet

METHOD AND DEVICE FOR CONTROLLING AN ESSENTIALLY CONTINUOUS PROCESS

TECHNICAL FIELD

The present invention relates to a method for controlling and supervising a continuous or semi-continuous process comprising at least two sub-processes and in particular to an improved method for controlling and supervising a process for production of paper or board. The present invention also relates to a device for carrying-out the invented method.

BACKGROUND ART

Material producers, such as producers of pulp, paper and board, are facing a rapidly changing world. They must meet increasing customer demands for specific grades in smaller batches. The products must meet quality demands specified within narrow limits. The increased environmental awareness is met by large efforts not only to meet the more stringent demands and regulations set on their activity but also to minimize the impact of their activity on the environment. Increased recycling within the production process as well as an increased use of reclaimed matter as raw material or additions to the process also put higher demand on the control and supervision of the process. Additionally these producers face a tougher competition, which can only be met with high quality products.

The product quality is dependent on many parameters which are influenced by the raw material supplied to the process, especially the consistency of raw material supplied, the additions made during treatments and the production conditions used under these treatments. Thus, the product quality can change substantially throughout these processes. Therefore, a method for process control needs to employ a system with sensors or devices for sampling throughout the process line and means to execute measurements and sampling, means to collect, collate and process information obtained from the process and means to execute corrective actions in the process.

One such technique is pulp tracking, which is a method for supervision of the pulp process. In general terms a process for production of paper or board comprises two main sub-processes, namely a pulp process and a paper or board manufacturing sub-process. When pulp tracking a specific volume of pulp is followed throughout the pulp step. The pulp tracking function divides the pulp process flow into a plurality of imaginary slices, each slices typically representing 2–10 tons of pulp corresponding to 5–20 minutes of production. The values for production variables, such as temperature, mass and liquid flows, together with values for quality variables or characterizing variables in the form of test results from samples taken on fiber and liquid from the slice at this production unit, are measured, stored and labeled in a slice database. Pulp tracking and similar techniques provide on-line quality information to be used for corrective actions. It also provides product documentation.

Other techniques comprise software to control, supervise and execute measurement of process variables and sampling to determine quality parameters throughout a product-line, whether in a process for production of pulp, paper or board.

Production variables measured or otherwise determined are typically temperature and flow of mass and liquids in the pulp process, temperature, moisture, pH and web speed, motor effects and pressures in the paper and board processes.

Quality variables determined by tests and analysis of samples are typically kappa number, viscosity, strength parameters, brightness, and residual bleaching chemicals.

It is known to characterize the conditions of a complex process or to predict quality variables for the product downstream or for the final product using, algorithms, statistical models obtained from multivariate data-analysis such as Principal Component Analysis (PCA), Principal Component Regression (PCR), Partial Least Square Regression (PLS), MultiLinear Regression Analysis (MLR), Discriminant Analysis or in a neural network. Before the algorithms and models are used they need to be calibrated based on a comparison of measured or otherwise determined values of the variables to be used for the prediction with measured or otherwise determined values of the actual outcome for the variable to be predicted.

U.S. Pat. No. 5,402,333 discloses a system and method for improving model product property estimates. One or more process simulation models are run on a computer in parallel with the actual process to provide estimates of steam composition and/or product properties further down the line, which estimates are used to control the process. The system provides estimates for closed-loop control process, i.e. the measured variables used for the estimate are controlled based on the estimate. In this way the quality of the end product can be improved. However, this control system does not affect the present batch, i.e. the batch on which the estimates are based, but the next batch in line. This means that there might be a rejected batch before high quality batches are delivered. A rejected batch may also be the outcome every time the production conditions are altered. Thus, there is a need for a control system, which is able to control the process in such a way that the rejection from the process is kept to a minimum.

The paper "Control of paper basis weight by expert SQC/SPC algorithm using distributed controls", by M A Keyes and A Kaya, Automatic Control World Congress 1990, pages 395–400, discloses a feedback control design and a statistical quality/process control (SQC/SPC) system. The process model in this system is used to predict the values of basis weight further down the line based on measured variable values earlier in the process. Based on such predictions of the outcome these earlier parameters are controlled, i.e. it is a feed back control system. This means that the same disadvantages apply to this control system as described above in conjunction with U.S. Pat. No. 5,402,333, namely only the next batch in line will be affected by the control.

OBJECTS OF THE INVENTION

The primary object of the present invention is to provide an improved method for process control for an essentially continuous process comprising at least two sub-processes, such as the production of paper or board, which minimizes the rejection for the produced product. This improved method shall also meet the increasing demands for higher quality, less impact on the environment, reduced consumption of energy and other resources and narrower specification limits at reduced or the same costs.

Another object of the present invention is to provide a method for simplifying the control and supervision of an essentially continuous process, comprising at least two sub-processes, in which the measured or otherwise determined values for a first sub-process are used to correct and/or predict the values in a subsequent second sub-process. It is further an object that a method according to the present invention shall include the correlation of the effects on a predicted variable of any corrective actions taken in the process.

Another object of the present invention is to provide a method, in which unstable or malfunctioning sensors are detected and identified. Thereby early warnings can be given such that the operator or the system for process control temporarily disregards values from this sensor in the waiting for a check and possible replacement of the sensor. The same applies for defective or malfunction production means.

SUMMARY OF THE INVENTION

According to the invention the above object is achieved by a method for control an essentially continuous process comprising at least two sub-processes, by tracking, processing and correcting variables for the product, the production means and/or any process media throughout the process line, wherein;

variable values from a first sub-process are measured, samples from the first sub-process are taken and tested or analyzed to determine a variable value;

the flow of the first sub-process is divided into imaginary slices, each slice representing a specific volume of the first sub-process flow and that at least some variable values are related to the specific slice volume;

any variable value obtained by measurements, sampling, analyzing or testing is processed and any variable value obtained for a specific slice volume is related to that slice volume;

at least one multivariate model is developed based on the variable values for a multiple of slice volumes from the first sub-process, the multivariate model is combined with a processed variable value, from the first sub-process, representing a specific slice volume, a variable value and/or a quality variable for the specific slice volume and/or another slice volume for a subsequent second sub-process downstream is predicted based on the combination of the multivariate model and the processed variable value, and the prediction is used for executing a corrective action on the subsequent second sub-process.

Thus, with the method according to the present invention it will be possible to correct a batch, which is already in production by using feed forward to the subsequent second sub-process. Thereby the rejection rate on produced batches will be reduced substantially. Also the quality of the produced batches can be kept in much narrower limits.

Other advantages of the present invention includes its capabilities to provide an improved documentation of production and quality variables as well as corrective actions taken throughout the continuous process which is representative also for smaller product quantities.

Other further advantages of the present invention will become apparent from the description of the invention and the preferred embodiments of the invention.

BRIEF DESCRIPTION OF THE DRAWINGS

The invention will be described more in detail while referring to a preferred embodiment shown in FIG. 1.

DESCRIPTION OF A PREFERRED EMBODIMENT

Figure 1:
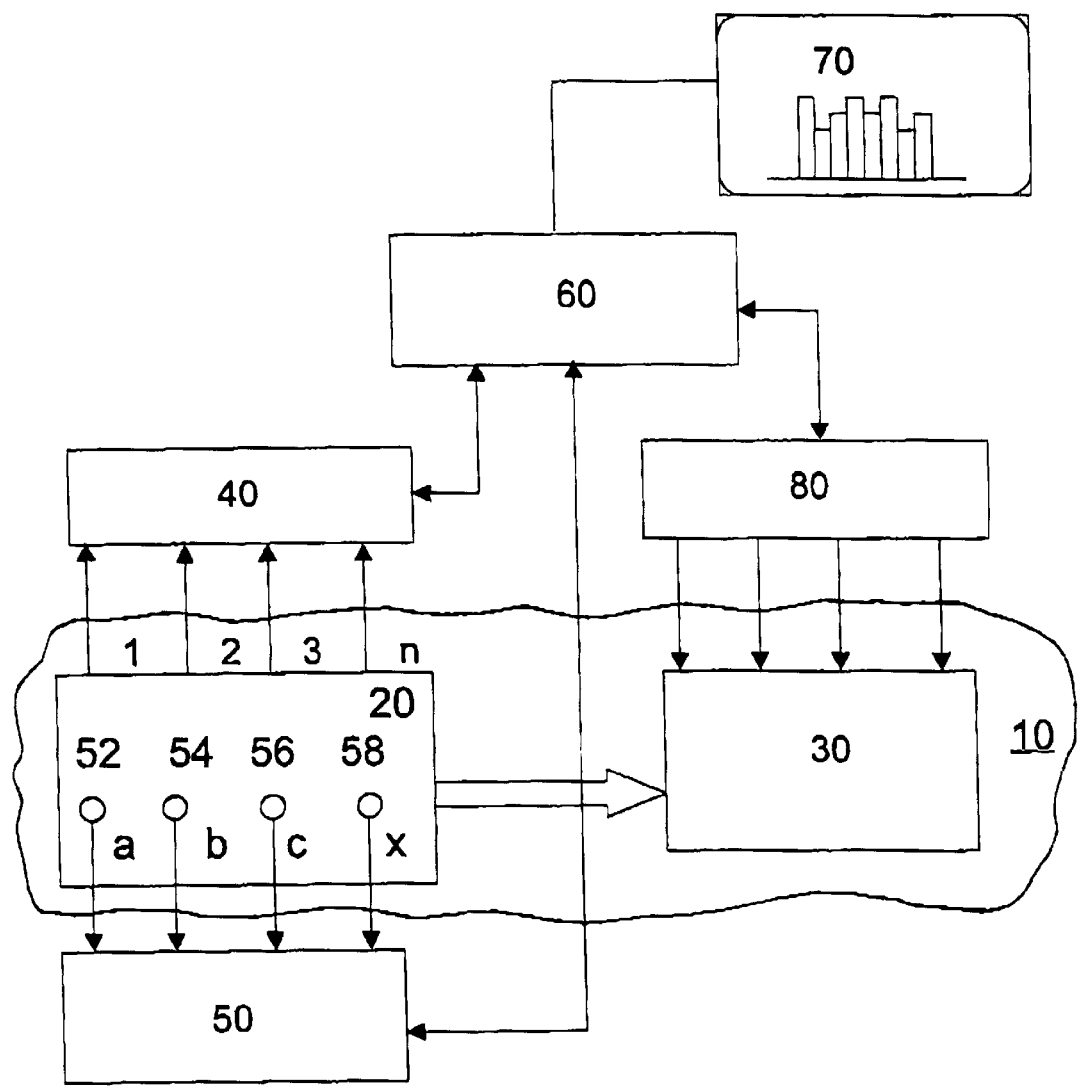
FIG. 1 shows a schematic outline of a continuous paper or board manufacturing process and the device for supervision and control of the continuous process which according to the present invention is associated with the process.

FIG. 1 shows a control system for controlling and supervising a continuous or semi-continuous process comprising two sub-processes. Even if the invention will be described in conjunction with a paper or board manufacturing process having two sub-processes it shall be understood that the present invention may be applied for other processes having two or more sub-processes.

The control system shown in FIG. 1 is used to control a paper or board manufacturing process 10 having a pulp sub-process 20 and a paper or board making process 30. The control system comprises a sampling system 40, a measuring unit 50, sensors 52, 54, 56 and 58, a control and processing unit 60, hereinafter referred to as the control unit, a displaying unit 70 and an actuating unit 80.

The sampling system 40 is used for taking samples in the pulp sub-process 20 at a number of discrete locations 1 to n. The sampling system 40 comprises the necessary sampling devices, analyzing devices and other electronic devices with suitable software for taking samples of and establishing variable values for the pulp. The samples taken are for example used to establish the changes of the fiber in the pulp sub-process. The fiber containing samples taken from the pulp sub-process are analyzed with for example spectrophotometric methods. The fibers in a suspension or in a fiber cake or any form of product are prepared to a test piece or sample in the form of a wet cake or dried wet cake. The cake is analyzed using lights with wavelengths in the areas of ultra-violet light, visible light, infrared or near infrared light, NIR. However, it shall be understood that also other spectrophotometric methods using electro-magnetic radiation may be used if appropriate. Obtained variable values are essentially used for feed-forward control of the subsequent paper-or board making sub-process using open or closed control loops, but area also included in models for prediction of variable values and trends for the subsequent sub-process. Variable values of particular interest are fiber size distribution and other fiber characterizing variables. These variables are then used combined with a multivariate model stored in the control unit 70 to predict quality variables such as strength parameters, brightness and air permeability for the subsequent paper or board making sub-process. Preferably the sampling is made at locations known to give representative variable values on which product quality of the subsequent sub-process depends or at locations known to give reliable information to make corrective actions on the subsequent sub-process. The sampling system 40 is connected to the control and processing unit 60. The control unit 60 controls when and where the sampling system 40 shall be activated. After sampling and analyzing the sampling system 40 transfers the result to the control system 60, which as mentioned above uses these values in the multivariate prediction model.

The measuring unit 50 is connected to sensors 52, 54, 56 and 58 for measuring and monitoring process variables in the pulp sub-process. The sensors 52, 54, 56 and 58 are placed at discrete locations a to x through out the pulp process. The measuring unit 50 includes software to control the sensors 52, 54, 56 and 58 and processes the data obtained therewith. Preferably the measurements are taken at locations known to give representative variable values on which the product quality for the subsequent sub-process depends or at locations known to give reliable information to make corrective actions on the subsequent sub-process. The measuring unit 50 is connected to the control unit 60. The control unit 60 controls when and where the measuring unit 50 shall be activated. However, it shall be understood that the measuring unit (50) itself may activate and control the sensors 52, 54, 46 and 58. After the measurements are obtained the measurement unit 50 transfers the result to the control unit 60, which uses these values in the multivariate prediction model.

The control unit 60 in the embodiment shown in FIG. 1 is an electronic device with software comprising algorithms, statistical models based on multivariate data-analysis such as Principal Component Analysis (PCA), Principal Component Regression (PCR), Partial Least Square Regression (PLS), MultiLinear Regression Analysis (MLR), Discriminant Analysis or a neural network for processing data received from both the sampling system 40 and the measuring unit 50. As mentioned above the control unit 60 is connected to the sampling system 40 and the measuring unit 50, but also to the displaying unit 70 and the actuating unit 80. For the communicating with the actuating unit 80 and the displaying unit 70 is it in most cases sufficient with a one-way communication from the control unit 60 to these units 70, 80. But in many cases it may be of importance that e.g. actuator settings are reported back from the actuating unit 80 to the control unit 60 as manipulated process variable values and therefore it may be appropriate to arrange a two-way communicating line between these units 60, 80.

The sampling system 40 and the measuring unit 50 are together with the control unit 60 arranged to performs so called pulp tracking. When pulp tracking a specific volume of the pulp is followed through the sub-process 20 starting from the wood chip supplied to the pulp sub-process 20. The tracking function divides the pulp process flow into a plurality of imaginary slices. Each slice typically represents 2–10 tons of pulp, corresponding to 5–20 minutes of production. Values for different production variables, which are measured or otherwise determined are typically temperature and flow of mass and liquids in the pulp process, temperature, moisture, pH and web speed, motor effects and pressures in the paper and board processes. Quality variables, which are determined by tests and analysis of samples, using the sampling system 40 are typically kappa number, viscosity, strength parameters, brightness, residual bleaching chemicals. These values for each slice are stored and labeled in a slice database, preferably comprised in the control unit 60. The tracking system, formed by the sampling system 40, the measuring unit 50 and the control unit 60, also comprises communicating means for collecting this information. Tracking and similar techniques provide on-line quality information, which is to be used for corrective actions on a subsequent sub-process and for product documentation.

The displaying unit 70 is used to give the operators direct on-line information of the ongoing process. The displaying unit 70 also has the capability to store information for a later evaluation.

The actuating unit 80 is used for corrective actions on the subsequent paper or board making sub-process 30 based on the information gathered and processed by the control unit 60. This actuating unit 80 is composed to cooperate within a total system for supervision the process 10 according to the present invention.

Although FIG. 1 shows a control system that comprises a plurality of hardware units 40, 50, 60, 70 and 80, each in the form of an electronic device with the necessary software, some or all of these units may be comprised, at least partly, in a software based system for process control. Irrespectively of the physical configuration of the supervisory and control system comprised in a device according to the embodiment of the present invention shown in FIG. 1 it comprises in one form or the other;

a tracking unit for measurements and supervision by tracking a slice volume and detecting process variables in such a slice volume through-out a sub-process, said tracking unit comprising sensors for variable measurement, sampling devices including, means for sampling, means for preparation of samples and means for testing, analyzing and/or characterizing samples, employing components contained in both the sampling system 40 and the measuring unit 50, and communication ports and lines to associate these components with the control unit 60, a unit for supervision by measurements and sampling at a plurality of discrete locations along the sub process, comprising, sensors for variable measurement contained in the measuring unit 50 and sampling devices including, means for sampling, means for preparation of samples and means for testing, analyzing and/or characterizing samples contained in the sampling system 40, a control unit 60 comprising or associated with communication ports and lines for receiving information on variable values, a displaying unit 70 and necessary communication ports and lines to associate this unit with the control unit 60 for presenting the process flow, controllers and actuators 80 for execution of corrective actions in a subsequent sub-process downstream based on information or instructions obtained from a preceding sub-process, said instructions being sent out by the control and processing unit 60, the control and processing unit 50 further comprising software for the following functions, dividing the sub-process flow into slices, each slice representing a specific volume of the sub-process flow, processing the variable values obtained by measurements and sampling, relating variable values to its specific slice volume, to develop a multivariate model based on variable values for a multiple of slice volumes and to process the variable values for the slice volume in the multivariate model to predict, for the specific slice volume, variable values and quality variables for the subsequent sub-process downstream.

Now the method for controlling an essentially continuous process using the system above will be described. In the system described above the process to be controlled is divided into two sub-processes. As stated above the method according to the present invention will use the variable values obtained from the first sub-process to execute corrective actions on the subsequent second sub-process.

The first step in the method is to divide the first or pulp sub-process flow into slices representing a specific volume in order to perform pulp tracking as mentioned above. Thereafter the control unit 60 activates the measuring unit 50 such that variables are measured by means of the sensors 52, 54, 56 and 58. It shall be noted that the number of sensors is not limited to any number, but may be adapted to the specific sub-process to be measured. Thus, the four sensors shown in FIG. 1 are only intended as an example. At least some of the measured variables are related to the specific slice volume. The obtained variable measurement values are then transferred to the control unit 60. Thereafter or simultaneously with the activation of the measuring unit 50, the sampling system 40 will be activated by the control unit 60. Samples are taken and variables are determined as the sample is tested or analyzed. Also the results obtained by the sampling system 40 will be transferred to the control unit 60.

The variable values obtained by the measurements and sampling are processed in the control unit 60. The control unit 60 further uses at least one multivariate model based on and using variable values for a multiplicity of slice volumes. It shall be understood that before any algorithms and models are used they need to be calibrated based on a comparison of a large number of measured or otherwise determined values for the variables to be used for the prediction with a large number of measured or otherwise determined values of the actual outcome for the variable to be predicted. The multivariate model is then combined with the processed variable values obtained for and related to a specific slice volume and a variable value and/or a quality variable is predicted for the subsequent second sub-process based on the combination of the multivariate model and the processed variable values. This prediction of the variables for the subsequent second sub-process is then used by the control unit 60 to control the subsequent second sub-process. The control unit 60 activates the actuator unit 80 to execute corrective actions on the subsequent second sub-process downstream.

Thus, with the method according to the present invention it will be possible to correct the batch, which is already in production by using feed forward to the subsequent second sub-process downstream. Thereby the rejection rate on produced batches will be reduced substantially. Also the quality of the produced batches can be kept within much narrower limits.

The model according to the present invention may also be used for prediction of a trend in a variable value, particular to predict a trend for a specific slice volume. Any prediction of a variable value or a trend further downstream in the process is continuously revised as the slice volume passes new production units. Preferably any obtained variable value is checked for reliability before further processing. The multivariate model is preferably up-dated continuously or on a regular basis as new variable values are measured, processed and included in the model. Often a plurality of multivariate models are developed, each model preferably being associated to at least one predicted quality variable.

According to one embodiment any value obtained for a predicted value or a value for which a trend has been predicted is determined and the determined value is compared with the predicted variable value or the value included in the trend of the same variable. Such detected deviation can be used in several ways, such as;

- to identify the nature of the disturbance causing the deviation;
- to execute a corrective action in the subsequent sub-process downstream based on a detected and processed deviation;
- to track, identify and analyze a malfunctioning or defective sensor;
- to track, identify and analyze a malfunctioning or defective actuator or controller; and
- to track, identify and analyze a malfunctioning or defective production unit or device.

The multivariate model is preferably based on methods such as Principal Component Analysis (PCA), Principal Component Regression (PCR), Partial Least Square Regression (PLS), MultiLinear Regression Analysis (MLR), Discriminant Analysis or a neural network. In most embodiments the multivariate analysis and data-treatment is also used to predict the variables and/or trends, to compare and to process any identified deviation and also to track and identify any malfunctioning or defective unit or component within the continuous process or within the control system. Preferably any multivariate model is continuously updated as the variable values for the most recently approved slice volumes and that such variable values are continuously included in the model.

According to one further embodiment the control unit 60 comprises a neural network associated with the continuous process. Such neural network comprises software means in form of algorithms, statistical model etc. to process any incoming information and variable value, to develop the multivariate model, to predict the variables and/or trends. Preferably the neural network is associated with means to regulate and administer execution of a corrective action, i.e. controllers and actuators, and means for the identification of malfunctioning or detective production means or a malfunctioning or detective sensor or sampling device, actuator or controller.

As the present invention in some embodiments offer the possibility to track and identify unstable, malfunctioning or defective sensors and also malfunctioning or defective production means it will provide early warnings on such disturbances, such that the operator or the system for process control temporarily can disregard theses values in the waiting for a check and possible replacement of the sensor or production means. This will increase the availability of the process line and reduce downtime, thereby improving the overall production costs.

The processing unit 50 preferably also comprises further software for one or more of the following functions, trend prediction, comparison of a predicted value with a determined value, processing any deviation between a measured process variable and a predicted value for this variable detected, for analyzing the nature of the deviation and for identifying a malfunctioning or a defective sensor, sampling device or production means, for controllers and actuators.

Even if the method above describes a continuous process divided into two sub-processes it shall be understood that the process can be divided into any number of sub-processes. For example the pulp sub-process may itself be divided into several sub-processes, of which the prediction obtained from variable values in a first sub process is used for executing a corrective action on a subsequent second sub-process.

What is claimed is:

1. A method for controlling an essentially continuous process, comprising at least
   two sub-processes, by tracking, processing and correcting variables for the product,
   a production means and/or any process media throughout a process line, wherein;
   variable values from a first sub-process are measured, samples from the first sub-process are taken and tested or analyzed to determine a variable value;
   a flow of the first sub-process is divided into imaginary slices, each slice representing a specific volume of the first sub-process flow and that at least some of the measured or sampled variable values are related to the specific slice volume; and
   any variable value obtained by measurements, sampling, analyzing or testing is processed and any variable value obtained for a specific slice volume is related to that slice volume; characterized in that
   at least one multivariate model is developed based on the variable values in a multiple of slice volumes from the first sub-process;
   the multivariate model is combined with a processed variable value, from the first sub-process representing a specific slice volume, a variable value and/or a quality variable for the specific slice volume and/or another slice volume for a subsequent second sub-process is predicted based on the combination of the multivariate model and the processed variable value, and the prediction is used for executing a corrective action on the subsequent second sub-process.

2. A method according to claim 1, characterized in that a trend in a variable value for a specific slice volume is predicted for the subsequent second sub-process based on the combination of the multivariate model and the processed variable value from the first sub-process (20).

3. A method according to claim 1, wherein a reliability of an obtained variable value is checked.

4. A method according to claim 1, wherein an actually obtained variable value for the subsequent second sub-process is compared with the predicted variable value or the value included in a trend of the same variable.

5. A method according to claim 4, wherein a deviation between a predicted and a determined value is processed together with a value variable, from the first sub-process, determined for the specific slice volume to identify the nature of a disturbance causing the deviation.

6. A method according to claim 5, wherein a corrective action for the subsequent second sub-process is executed based on the processed deviation.

7. A method according to claim 5, wherein a malfunction or defective sensor is identified based on the processed deviation.

8. A method according to claim 5, wherein a malfunction or defective production unit is identified on the processed deviation.

9. A method according to claim 5, wherein a malfunctioning or defective controller or actuator is identified based on the processed deviation.

10. A method according to claim 1 to control an essentially continuous paper or board making process comprising a first pulp sub-process and a subsequent paper or board manufacturing sub-process, wherein an on-line, model based, process control of a paper making sub-process is executed based on a processed measured variable value deviation.

11. A method according to claim 10, wherein a sample taken in the pulp sub-process is analyzed by a spectrophotometric method using ultra-violet, infrared, near infrared or visible light.

12. A method according to claim 11, wherein a sample of a fiber containing product is taken repeatedly in the pulp sub-process.

13. A method according to claim 10, 11, or 12, wherein a sample taken from a fiber line in a pulpmill, or from stock preparation area, is prepared as a wet cake or dried wet cake and analyzed by a spectrophotometric measurements to determine fiber size distribution or any other fiber characterizing variable, and any variable value obtained is used to predict a quality variable like a strength parameter, brightness, air permeability of the paper product.

14. A method according to claim 1, wherein a method for multivariate data-analysis is used to develop the multivariate model, predict a variable and/or trend, for the comparison and/or for the processing of any identified deviation.

15. A method according to claim 1, wherein the multivariate model is continuously updated as the value for the most recent approved slice volumes is continuously included in the model.

16. A device for carrying-out a method for controlling an essentially continuous process, comprising at least two sub-process, by tracking, processing and correction of variables for the product, a production means an/or any process media throughout a process line, with a unit for measurements and supervision (50) with means for tracking and detecting process variables, comprising:
    a subsystem of sensors for variable measurement,
    a sampling subsystem comprising, means for sampling, means for preparation of samples and means for testing and/or analyzing and/or characterizing samples;
a control and processing unit comprising:
    means for receiving information on variable values on-line,
    means for presenting the process flow through the production units,
    means for dividing the flow of a first sub-process into imaginary slices, each slice representing a specific volume of the first sub-process flow,
    means for processing any variable value obtained by the measurements and sampling,
    means for relating a variable value to its specific slice volume,
    means for sending out information to control the execution of any corrective action deemed to be needed based on the processing of a variable value,
    actuating means for execution of a corrective action in a subsequent second sub-process based on information from the control and processing unit, and wherein the control and processing unit further comprises:
        means to develop one or more multivariate models based on variable values in a multiple of slice volumes;
        means to combine a processed variable value representing a specific slice volume with the multivariate model, and
        means to predict a variable value and/or quality variable for this slice volume and/or an other slice volume for the subsequent second sub-process based on the combination of model and the processed variable value.

17. A device according to claim 16, wherein the control and processing unit comprises means for trend prediction.

18. A device according to claim 16, wherein the control and processing unit comprises means for comparing a predicted value with a determined value for the same variable, means to process any deviation detected and means to analyze the nature of the deviation.

19. A device according to claim 18, wherein the control and processing unit comprises means for identifying a malfunctioning or defective sensor or sampling device.

20. A device according to claim 18, wherein the control and processing unit comprises means for identifying malfunctioning or defective production means.

21. A device according to claim 18, wherein the control and processing unit comprises means for identifying malfunctioning or defective actuator or controller.

22. A device according to claim 16, wherein the control and processing unit comprises software for a multivariate data-analysis and/or for multivariate modeling based on obtained variable values.

23. A device according to claim 22, wherein the control and processing unit comprises a neural network for an identification of malfunctioning or detective production means or a malfunctioning or detective sensor or sampling device.

24. A device according to claim 23, wherein the neural network comprises means to regulate and administer the execution of a corrective action.

25. A device for control of an essentially continuous paper making process such as a process for production of paper or board according to claim 16, comprising a pulp sub-process and a paper or board making sub-process characterized in that the control and processing unit comprises software for an on-line, model based, process control for the paper making sub-process based on any processed measured variable value and/or any deviation in the pulp sub-process.

26. A device according to claim 25, including spectrophotometric means arranged for analyzing a fiber sample using ultra-violet visible, near infrared or infrared light.

27. A device according to claim 25, including sampling means for taking a sample of any fiber containing product and/or any process media throughout the process line.

28. A device according to claim 25 including preparation means for preparing a sample taken from a fiber line in a pulp mill or from a stock preparation area to a test piece in the form of a wet cake or dried wet cake, analyzing means for spectrophotometric measurements on the test piece to determine fiber size distribution and/or any other fiber characterizing variable, and processing means to correlate any variable value obtained to a predicted quality, variable like a strength parameter, brightness, air permeability of the paper product.

29. A method for controlling an essentially continuous process comprising at least one first upstream sub-process and at least one second downstream process, by tracking, processing and correcting variables for the product, a production means and/or any process media throughout a process line, wherein;

variable values from the first sub-process are measured;

samples from the first sub-process are taken and tested or analyzed to determine a variable value;

a flow of the first sub-process is divided into imaginary slices, each slice representing a specific volume of the first sub-process flow and that at least some of the measured or sampled variable values are related to the specific slice volume;

any variable value obtained by measurements, sampling, analyzing or testing is processed and any variable value obtained for a specific slice volume is related to that slice volume; and a corrective action is executed in the process based on a processed variable value characterized in that at least one multivariate model is developed based on the variable values in a multiple of slice volumes from the upstream sub-process, the multivariate model is combined with a processed variable value, from the upstream sub-process, representing a specific slice volume in the upstream sub-process, a downstream sub-process variable value and/or a quality variable for the product from the downstream sub-process is predicted for the specific slice volume and/or another slice volume of the downstream sub-process based on the combination of the model and the processed upstream sub-process variable value, and the predicted downstream sub-process variable value and/or quality variable of a first upstream process is incorporated as a feed forward value from an upstream slice volume in the corrective action calculated for a downstream slice volume in another sub-process.

* * * * *